Nov. 24, 1964
W. E. PLASTER ETAL
3,158,661
ALKYLATION PROCESS AND APPARATUS
Filed May 11, 1961
2 Sheets-Sheet 1
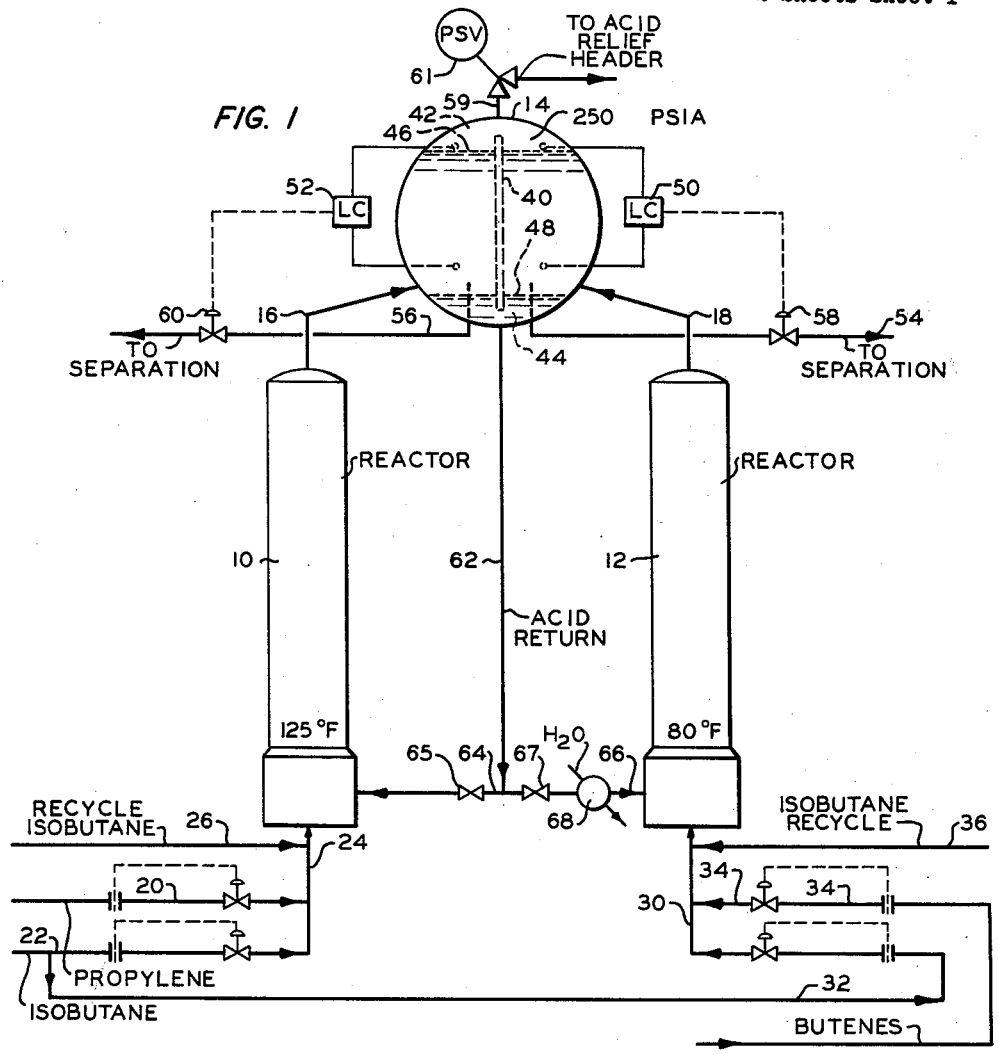
FIG. 1
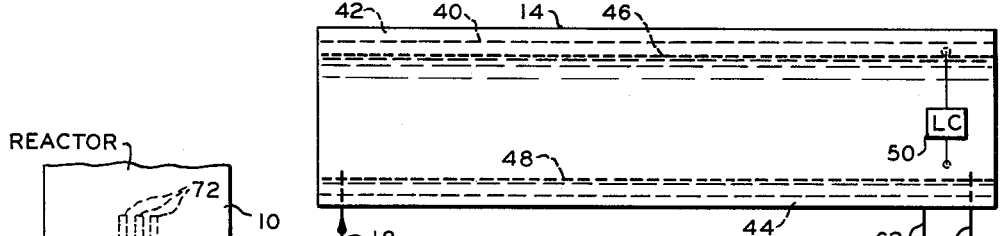
FIG. 2
FIG. 3
INVENTORS
W.E. PLASTER
R.E. DIXON
BY *Hudson & Young*
ATTORNEYS

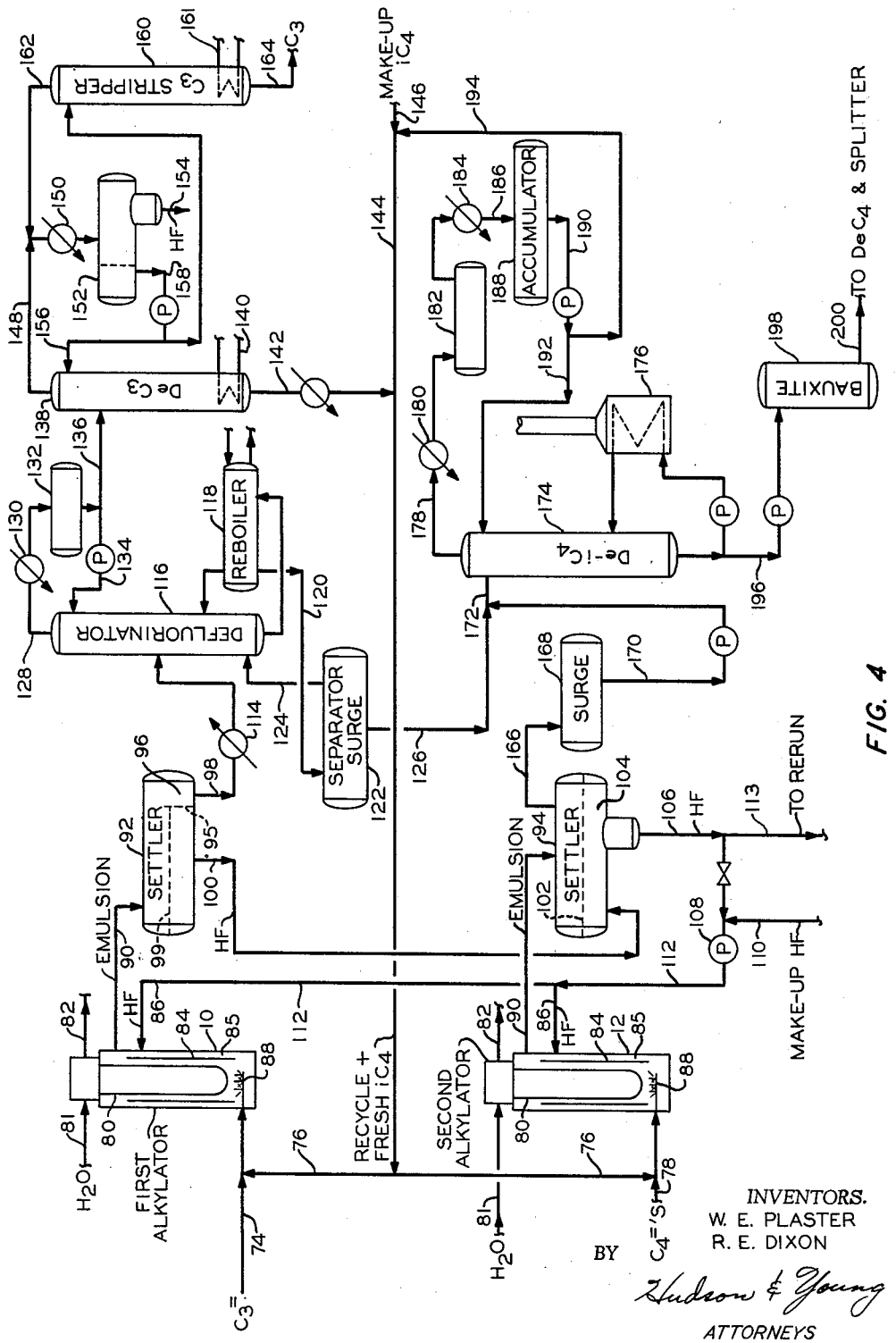

United States Patent Office 3,158,661
Patented Nov. 24, 1964

3,158,661
ALKYLATION PROCESS AND APPARATUS
William E. Plaster and Rolland E. Dixon, Bartlesville, Okla., assignors to Phillips Petroleum Company, a corporation of Delaware
Filed May 11, 1961, Ser. No. 121,800
19 Claims. (Cl. 260—683.48)

This invention relates to a process and apparatus for the alkylation of isoparaffins with two or more different olefins with a liquid acid alkylation catalyst. This application is a continuation-in-part of our copending U.S. application S.N. 857,950, filed December 7, 1959, and now abandoned.

The alkylation of an isoparaffin with one or more olefins in a single alkylation zone is conventional in the art. Various types of catalysts have been utilized in this reaction, including sulfuric acid, hydrofluoric acid, phosphoric acid, certain halo sulfonic acids, and aluminum chloride. The preferred catalyst is substantially anhydrous hydrofluoric acid because of the relative ease with which it can be used and reused and because of the superior quality of the alkylate that is produced. It is the usual practice to alkylate an isoparaffin with two different olefins in separate reactors and pass the separate alkylate streams to separate acid settlers or separation zones. It is also common practice to alkylate an isoparaffin with two or more olefins in a single reactor and separate the resulting alkylate from the acid in a single separator.

We have devised a process which produces alkylates of higher quality by alkylating an isoparaffin with different olefins in different reactors, mixing the acid recovered from the separate alkylate streams, and recycling the mixed acid to the different reactors which produces separate alkylate streams of higher quality than can be produced by alkylating the isoparaffin with the olefins in a single alkylator and more economically with less equipment.

Accordingly, it is an object of the invention to provide an improved process and apparatus for simultaneously alkylating one or more isoparaffins with at least two different olefins and effecting the separation of the different alkylates from the acid catalyst in a single separation zone or settler. Another object is to provide an improved process for simultaneously and separately alkylating an isoparaffin with two or more olefins to produce a higher quality alkylate than is obtained by alkylating the isoparaffin with both olefins in a common alkylation zone. A further object is to provide an improved process and apparatus for separately recovering two or more different alkylates from the acid catalyst used in the alkylating process. It is also an object of the invention to provide an alkylation process and apparatus which effect improved heat control of the process. A further object is to provide an improved process for the separate recovery of alkylate and acid. Other objects of the invention will become apparent upon consideration of the accompanying disclosure.

A broad aspect of the invention comprises alkylating in separate alkylators an isoparaffin with different olefins at different temperatures, using a liquid acid alkylation catalyst, separately recovering the different alkylates from the acid catalyst, combining the acid from the different alkylate streams, and recycling separate streams of the combined acid to the separate alkylators.

In one embodiment of the invention, the separate alkylate streams are passed to a common settler from which the separate alkylates are recovered separately and the acid from the separate streams is combined in the bottom of the settler.

A further embodiment of the invention comprises depropanizing-defluorinating the alkylate from the propylene-isobutane alkylator and passing the resulting alkylate stream to a common deisobutanizer along with the alkylate from the butylene-isobutane alkylator. The common settler comprises a vessel provided with one or more upright baffles dividing the intermediate level of the settler into two or more separate zones or compartments for different alkylates and allowing the acid to settle into a common zone in the bottom of the settler from which the acid is recycled to the alkylators. Similarly, the space above the baffle or baffles comprises a single vapor space under a single vapor pressure.

The preferred olefins in the process are propylene and butylenes but any $C_3$ to $C_7$ olefins may be used. Isobutane is preferred as the isoparaffin but $C_4$ to $C_8$ isoparaffins may be used. The fact that the alkylatable stream containing the lighter olefin requires a higher temperature to produce the best alkylate is significant in the invention with respect to heat utility obtained by mixing of the acid from both alkylate-acid streams for recycling to the alkylators. This difference in acid temperature permits recycling a mixed acid of lower temperature to the higher temperature alkylator, thereby simplifying heat exchange required to operate the dual alkylation.

The invention will be better understood by reference to the accompanying schematic drawing of which FIGURE 1 is an elevation of an arrangement of apparatus illustrating a preferred embodiment of the invention; FIGURE 2 is a side elevation of the settler of FIGURE 1; FIGURE 3 is an enlarged elevation of the lower section of one of the alkylators of FIGURE 1; and FIGURE 4 is a flow diagram of another embodiment of the invention.

Referring to FIGURE 1, a pair of alkylators 10 and 12 are connected with a settler 14 thru alkylate effluent lines 16 and 18. Olefin supply line 20 and isoparaffin supply line 22 connect with feed line 24 leading into the bottom of alkylator 10. Isoparaffin recycle line 26 also connects with feed line 24. Alkylator 12 is provided with a feed line 30 which is connected with an isoparaffin supply line 32 (connected with supply line 22) and with olefin supply line 34. Isoparaffin recycle line 36 also connects with feed line 30.

Settler 14, as shown, is an elongated cylindrical tank or vessel provided with an upright baffle or partition 40 which is welded or otherwise sealed to the ends of the tank and is spaced from the top and the bottom thereof to provide a common vapor space 42 and a common acid collecting zone 44. A hydrocarbon-vapor interface is designated 46 and the hydrocarbon-acid interface is designated 48.

A liquid level controller 50 maintains a suitable liquid level in the right compartment of the settler and a similar liquid level controller 52 in the left compartment of the settler maintains a similar liquid level in the opposite compartment. The alkylate in the right compartment is withdrawn by a line 54 which extends into the settler to a level above the bottom of baffle 40 into the alkylate and a corresponding line 56 withdraws alkylate from the opposite compartment of the settler. Level controller 50 controls the amount of opening of a motor valve 58 in line 54 and level controller 52 controls the amount of opening of a motor valve 60 in line 56. A line 59 connects with vapor space 42 and leads to an acid relief header not shown. A pressure safety valve 61 is positioned in line 59 to relieve the vapor pressure in vapor space 42 at a suitable maximum, generally about 30 p.s.i. above the normal operating pressure in space 42. Actually, the flow rates into the separate alkylate compartments will vary and the withdrawal rates will be varied, accordingly, by level controllers 50 and 52 thru valves 58 and 60.

An acid return line 62 connects with the acid compartment 44 in the bottom of the settler and delivers recycle acid to line 64 leading into alkylator 10 and to line 66 leading into alkylator 12. An acid cooler 68 is provided in line 66 to lower the temperature of the recycle acid and thereby control the temperature in alkylator 12 below that in alkylator 10.

Referring to FIGURE 2, the baffle 40 is shown in settler 14 extending from end to end thereof and spaced from the top and bottom of the tank. Other elements shown in FIGURE 2 are readily interpreted from the discussion of FIGURE 1. It should be noted that feed is introduced to vessel 14 in one end section and alkylate and acid are withdrawn therefrom at the opposite end section. This allows better separation as the liquids flow thru the elongated vessel.

FIGURE 3 shows acid line 64 entering the lower expanded section 70 of alkylator 10. Hydrocarbon feed line 24 extends into and substantially thru section 70 and is provided with nozzles 72 for mixing acid and hydrocarbon feed to facilitate the efficiency of the alkylation reaction as the reactants pass thru the alkylator in admixture with the acid catalyst. Alkylators 10 and 12 have been fabricated of ordinary pipe of substantial diameter, such as 4 to 12 inches, and have been found to be efficient.

The invention is not dependent upon specific reaction conditions as these are conventional and well known in the art. However, the ratio of isoparaffin to olefin is usually maintained somewhere in the range of 4:1 to 20:1. The ratio of acid to hydrocarbon feed, particularly, when utilizing hydrofluoric acid, is maintained at about 4 to 1 but this may be varied in the range of 0.5:1 to 6:1. The larger volume of acid recycle to the reactors is utilized as a means of temperature control as well as a catalyst. Alkylation temperature may vary from about 50 to 200° F.; however, when alkylating isobutane with butylene, a reaction temperature in the range of about 60 to 95° F. is preferred; and when alkylating isobutane with propylene a temperature in the range of approximately 110 to 125° F. is preferred.

The invention encompasses the use of different isoparaffins as well as different olefins in the feeds to the alkylators. Thus, isobutane may be fed to one alkylator while isopentane is fed to the other alkylator.

The settler shown in the drawing is a cylindrical tank positioned with its axis substantially horizontal and this type of tank is preferred; however, the invention is not limited to a cylindrical tank or to one horizontally elongated. A spherical tank or one in the form of a rectangular prism is also within the scope of the invention, the essential feature being the horizontal baffle extending completely across the vessel laterally to provide spaces both at the top and bottom of the vessel between the baffle and the shell of the vessel for vapor and acid, and separate sections for alkylates.

The alkylates withdrawn from settler 14 thru lines 54 and 56 are separately processed in conventional manner to recover purified alkylates and unreacted feed. The isobutane (or other isoparaffin) is recycled to the alkylators thru lines 26 and 36.

Settler 14 is positioned at the proper elevation above the alkylators to provide gravity flow at the desired rate to the alkylators. Sufficient acid is maintained in the system to control the acid level in settler 14 above the level of the bottom edge of baffle 40. Valves 65 and 67 in acid feed lines 64 and 66 may be adjusted to assist in controlling acid flow when necessary.

When an alkylation unit such as that shown in the drawing is operated by feeding to one alkylator, butylenes at the rate of 407 b.p.s.d. (barrels per stream day), isobutane at the rate of 4140 b.p.s.d., and hydrofluoric acid at the rate of about 22,950 b.p.s.d., at an alkylation temperature of about 80° F., 1400 b.p.s.d. of butylene alkylate are produced. This alkylate has a research octane number in the range of 108 to 109 (+3 cc. TEL). Simultaneously, 758 b.p.s.d. of propylene alkylate are produced in the second alkylator by feeding thereto 373 b.p.s.d. of propylene, 3751 b.p.s.d. of isobutane and about 20,950 b.p.s.d. of hydrofluoric acid at a reaction temperature of about 125° F. This propylene alkylate has a research octane number in the range of 102.0 to 102.5 (+3 cc. TEL). If the combined olefin feed (propylene and butylenes) is fed to a single reactor, the research octane number of the total alkylate is in the range of 102.5 to 103.0 (+3 cc. TEL).

Referring to FIGURE 4, a first alkylator 10 and a second alkylator 12 are fed separate hydrocarbon feeds, a propylene rich stream in line 74 and isobutane in line 76 passing to alkylator 10 and a feed rich in butylenes in line 78 and isobutane in line 76 passing to alkylator 12. Each alkylator is an upright cylinder containing hairpin heat exchange tubes 80 thru which water or other coolant is circulated from line 81 to line 82. An open-ended cylindrical baffle 84 surrounds the hairpin tubes in spaced apart relation thereto and to the inner wall of the alkylator so as to provide an outer annulus 85 for acid flow from acid line 86 which leads into the upper end of the annulus below the top of cylindrical baffle 84. The feed is introduced to the lower section of the alkylators by means of a distribution ring 88 and is immediately mixed with heavier acid (HF) flowing down annulus 85 where it is being cooled because of the indirect heat exchange thru baffle 84. The feed is alkylated as it rises within baffle 84 and the resulting emulsion of alkylate and acid is passed thru effluent lines 90 to settlers 92 and 94. Settler 92 is provided with an upwardly extending baffle 95 which forms an overflow alkylate chamber 96 from which effluent alkylate line 98 extends. A liquid-level controller (not shown) maintains the acid level 99 in settler 92 below the top of baffle 95.

Acid from settler 92 passes via line 100 to the lower section of settler 94 so that the acid phases from the two alkylators are mixed. A liquid level controller (not shown) maintains a suitable acid level 102 in settler 94. The mixed acid from mixing chamber 104 in the bottom of settler 94 passes thru line 106 to pump 108 which picks up makeup acid from line 110 and passes the mixed acid stream via line 112 to both alkylators. Acid is continuously or intermittently passed via line 113 to rerun.

The alkylate from chamber 96 of the first settler passes thru heat exchanger 114 into defluorinator-depropanizer column 116 which is provided with reboiler 118 connected in conventional manner with the lower section of the column and supplied with heat by indirect heat exchange. The bottom of the reboiler is connected by conduit 120 with a separator-surge drum 122. Line 124 connects the top of drum 122 with column 116 for returning to column 116 the HF and propane which separates from the alkylate therein. The resulting alkylate containing isobutane passes thru line 126 to further processing described below.

The overhead from column 116 comprising propane and HF is passed thru line 128 and heat exchanger 130 to accumulator 132. A minor portion of the accumulate is returned to the top of column 116 via line 134 and the other portion is passed via line 136 to depropanizer column 138. Heat for column 138 is supplied by indirect heat exchange means 140. Residual isobutane is recovered from column 138 in line 142 which passes the isobutane to line 144 for recycle to line 76, along with make-up isobutane from line 146.

The overhead stream from column 138 in line 148 is passed thru heat exchanger 150 to accumulator 152. The HF settles out and is recovered thru line 154 for recycle to the alkylators (by conduit not shown). A portion of the accumulate from the upper phase in accumulator 152 is passed thru line 156 to column 138 as reflux and the remaining portion is passed via line 158 to stripping column 160 to which heat is supplied by heat exchanger 161. Acid recovered overhead thru line 162 is passed to accumulator 152 and is recovered in line 154. Propane is recovered as bottoms in line 164.

Alkylate from the second settler 102 is passed via line 166 to surge tank 168 from which it is passed via line 170 in admixture with alkylate from line 126 thru line 172 to deisobutanizer column 174. Column 174 is supplied heat from reboiler 176. The overhead consisting principally of isobutane is passed via line 178 thru a cooler 180 and a first accumulator 182 from which the accumulate is passed thru a second cooler 184 and thru line 186 to a second accumulator 188. The accumulate passes thru line 190 from which a portion is recycled as reflux thru line 192 and the remaining portion passes via line 194 to line 144 for recycle. The deisobutanized alkylate bottoms from column 174 passes thru line 196 to bauxite treater 198 and to further treatment desired, such as debutanizing, via line 200.

In alkylating isobutane with propylene in first alkylator 10 in the system shown in FIGURE 4, the temperature in this alkylator can be maintained in the range of 110 to 125° F. with little or no heat exchange necessary by mixing the acid (HF) in line 100 with the acid separated from the second alkylate stream in settler 94, the acid in this settler being substantially cooler because of the lower temperature maintained in the second alkylator 12. The temperature in alkylator 12 is maintained substantially below that in alkylator 10 such as in the range of 60 to 95° F. because of the higher yield of alkylate of high octane number obtained by operating at lower temperatures of this range. Thus, all of the heat exchange can be effected in the second alkylator to simplify the process. By utilizing water from a conventional cooling tower as the coolant in heat exchange coils 80 in the second alkylator, without other means of cooling other than natural evaporation, the temperature of this alkylation step can be maintained in the range of about 90 to 95° F. so that the temperature of the mixed acid recycled to the alkylators is in the range of about 100 to 105° F., without cooling the first alkylator by indirect heat exchange. This permits operating the first alkylator at a temperature in the range of 120 to 125° F. which produces high quality alkylate at high yield. By refrigerating the coolant circulated thru the cooling coils of the second alkylator, substantially lower temperatures may be maintained in both alkylators without resorting to indirect heat exchange in the first alkylator.

While the arrangement of apparatus of FIGURE 4 shows mixing of the acid from the first alkylator with the acid from the second alkylator in chamber 104 of settler 94, the mixing may be effected in a separate mixing vessel (not shown) in line 106 or in line 112. However, the arrangement shown is advantageous because it permits the use of a single pump (108) to circulate the total acid. The fact that the liquid in settler 92 is at a substantially higher temperature than the liquid in settler 94, causes acid to flow thru line 100 into settler 94 because of the natural difference in pressure in the two settlers.

The depropanizing and defluorinating of the alkylate from the first alkylator in column 116 renders it feasible to pass the resulting alkylate, along with the alkylate from the second settler to isobutanizing column 174, thereby greatly simplifying the recovery process and contributing to better economics therefor. The use of separator-surge drum 122 also contributes materially to the process since there is a substantial recovery of propane and HF from the alkylate in this drum, the recovered HF and propane being passed back to column 116 thru line 124.

FIGURE 4 represents an actual commercial plant in operation producing alkylate in a pair of first and a pair of second alkylators arranged in parallel. A $C_3$ feed of 440 b./d. (barrels per day) was combined with a refinery $C_3$ feed of 2317 b./d. This feed of 2757 b./d. was made up of 1 barrel of ethane, 826 barrels of propane, 1324 barrels of propylene, 312 barrels of isobutane, 227 barrels of butylenes, and 67 barrels of butane. The isobutane feed to the first alkylator amounted to 21,434 b./d. of which 18,290 barrels was isobutane and the balance consisted of ethane, propane, n-butane, isobutane, and light alkylate. The alkylate effluent from the first alkylator comprised 2,421 b./d. of light alkylate and 162 b./d. of heavy alkylate.

The feed to the second alkylators comprised 4,650 b./d. of refinery $C_4$ hydrocarbons containing 3 barrels of ethane, 353 barrels of propane, 487 barrels of propylene, 1128 barrels of isobutane, 1782 barrels of butylenes, 685 barrels of n-butane, and 212 barrels of isopentane. The recycle and fresh isobutane fed to the second alkylators amounted to 30,699 b./d. of which 26,100 barrels was isobutane and the balance mostly propane and n-butane. About 136 b./d. of HF was fed to each alkylator system. The effluent alkylate from the second alkylator system contained 3541 b./d. of light alkylate and 237 b./d. of heavy alkylate. The light alkylate in line 200 mounted to 5962 b./d. and the heavy alkylate amounted to 399 b./d.

The second alkylators were cooled with cooling tower water at a temperature in the range of 85 to 95° F. flowing thru the heat exchangers which maintained the temperature in these alkylators in the range of 90 to 95° F. By mixing the acid from the two alkylator systems and passing the resulting mixture at a temperature in the range of 100 to 105° F. to both alkylator systems, the temperature in the first alkylator system (propylene alkylation) was maintained at about 115° F. without circulation of cooling fluid thru the heat exchangers therein.

Certain modifications of the invention will become apparent to those skilled in the art and the illustrative details disclosed are not to be construed as imposing unnecessary limitations on the invention.

We claim:

1. Apparatus for separately alkylating two different streams of alkylatable hydrocarbon comprising first and second alkylators each having an inlet for acid, an inlet for hydrocarbon feed comprising an isoparaffin and an olefin and an outlet for alkylated product; an acid settler in the form of a closed vessel having an upright baffle extending laterally therethru from wall to wall but spaced from the top and bottom thereof; a pair of feed inlets in a lower section of said settler on opposite sides of said baffle; an acid outlet in the bottom of said settler; a pair of effluent alkylate lines extending from said settler at a level intermediate the top and bottom of said baffle and on opposite sides thereof, each having a motor valve therein; a pair of liquid level controllers on said settler on opposite sides of said baffle, one being connected to one of said motor valves and one to the other, thereby being adapted to maintain a liquid level on each side of said baffle below the top and substantially above the bottom thereof; conduit means connecting the outlet of said first alkylator to one of the feed inlets in said settler; conduit means connecting the outlet of said second alkylator to the other of said feed inlets; and an acid return line from said acid outlet to each of said acid inlets.

2. The apparatus of claim 1 wherein said vessel is an elongated cylindrical tank having its axis horizontal, said feed inlets are in one end section of said tank and said effluent alkylate lines take off from the opposite end section.

3. The apparatus of claim 1 including an acid heat exchanger in one of said acid return lines.

4. A settler for separating acid from separate streams of alkylate of different composition which comprises a closed vessel; at least one upright baffle extending laterally from wall to wall of said vessel but spaced from the top and bottom thereof to provide at least 2 laterally separated compartments open to the space across said vessel below said baffle and to the space above said baffle; a separate feed line into each said compartment adjacent one end of said baffle; a separate alkylate withdrawal line from each said compartment spaced laterally from the corresponding feed line and adjacent the opposite end of said baffle; and an acid withdrawal line from the bottom of said vessel.

5. A settler for separating acid from separate streams of alkylate of different composition which comprises a closed vessel; at least one upright baffle extending laterally from wall to wall of said vessel but spaced from the top and bottom thereof to provide at least 2 laterally separated compartments open to the space across said vessel below said baffle and to the space above said baffle; a separate feed line into each said compartment adjacent one end of said baffle; a separate alkylate withdrawal line from each said compartment spaced laterally from the corresponding feed line and adjacent the opposite end of said baffle; an acid withdrawal line from the bottom of said vessel; a liquid level controller for each compartment, sensitive to a liquid level just below the top edge of said baffle; and a motor valve in each said alkylate withdrawal line operatively controlled by the corresponding level controller.

6. A settler for separating a common heavier liquid from separate streams containing same and different lighter liquids which comprises a horizontally elongated vessel having at least one upright baffle extending from end to end of said vessel but spaced apart from the top and bottom of said vessel to provide at least two laterally separated compartments open to the space across said vessel below said baffle, thereby forming a common heavy liquid collecting zone, and open to the space above said baffle, thereby forming a common vapor collecting zone; a separate feed line to each said compartment in one end section thereof; a separate lighter liquid withdrawal line from each said compartment in the opposite end section from the respective feed line; a heavy liquid withdrawal line from said heavy liquid collecting zone; and a vapor withdrawal line from said vapor collecting zone.

7. The settler of claim 6 wherein said vessel is cylindrical.

8. The apparatus of claim 6 including a liquid level controller for each compartment, sensitive to a liquid level just below the top edge of said baffle; and a motor valve in each said alkylate withdrawal line operatively controlled by the corresponding level controller.

9. Apparatus for separately alkylating two different streams of alkylatable hydrocarbons comprising first and second alkylators each having an inlet for acid, an inlet for hydrocarbon feed comprising an isoparaffin and an olefin, and an outlet for alkylated product and acid; a first settler having an inlet for alkylated product and acid connected with the outlet of said first alkylator, an acid outlet in its bottom section, and an alkylate outlet; a second settler having an inlet for alkylated product connected with the outlet of said second alkylator, an acid outlet in its bottom section, and an alkylate outlet; a common mixing chamber for acid of both said settlers communicating with the acid outlet of each settler; and conduit means connecting said common mixing chamber with the inlet for acid in each said alkylator.

10. The apparatus of claim 9 wherein each alkylator is of circular horizontal cross section and vertically elongated and provided with indirect heat exchange hairpin tubes depending from the top section of the alkylator, with an annular baffle surrounding said tubes and extending from an upper section of the alkylator to adjacent the level of the lower end of said tubes in spaced-apart relation to the inner wall of said alkylator to provide an annulus for acid, said feed inlet comprising a conduit extending into said alkylator below said baffle and tubes, said acid inlet comprising a conduit leading into the upper end of said annulus, and said outlet for alkylated product and acid comprising a conduit extending into said alkylator above said baffle.

11. The apparatus of claim 9 wherein said mixing chamber comprises the lower portion of said second settler and said conduit means comprises a single conduit having a pump therein leading from the acid outlet of said second settler and a branched conduit connecting said single conduit with the acid inlets in the alkylators.

12. The apparatus of claim 9 wherein said first and second settlers comprise horizontally elongated cylindrical tanks, said first settler having an upwardly extending baffle from the bottom of one end section to provide an alkylate collection chamber therein and said alkylate outlet connects with the lower section of said chamber; said second settler having an alkylate outlet from its top so as to operate liquid full.

13. The apparatus of claim 9 further comprising a defluorinator-depropanizer column communicating with the alkylate outlet of said first settler and having a reboiler communicating by feed and return lines with the lower section of said column, and an overhead line for propane and acid; a deisobutanizer column communicating with the alkylate outlet of said second settler having an overhead line for isobutane and a bottoms outlet for alkylate; and conduit means connecting the bottom of said reboiler with said deisobutanizer to feed defluorinated-depropanized alkylate of the first alkylator to last said column.

14. The apparatus of claim 13 including a separator-surge drum in said conduit means and a line connecting the upper section of said drum with said defluorinator-depropanizer column for return of separated propane and HF to said column.

15. A process for simultaneously and separately alkylating a first stream consisting principally of propylene and isobutane and a second stream consisting principally of butylenes and isobutane comprising passing said first stream in admixture with an acid alkylation catalyst thru a first alkylation zone under alkylating conditions, including a temperature in the range of about 110–125° F., to form a first alkylate stream; simultaneously passing said second stream in admixture with said acid alkylation catalyst thru a second alkylation zone under alkylating conditions, including a temperature in the range of about 60 to 80° F., to form a second alkylate stream; passing said first alkylate stream and said second alkylate stream into separate settling zones for separating acid and vapor from the alkylates; allowing acid catalyst to settle from both said settling zones into a common acid recovery zone, whereby the temperature of said acid is below the temperature in said first alkylation zone; allowing vapor to escape from both said settling zones into a common vapor recovery zone; withdrawing vapor from said common vapor recovery zone in a single stream to control pressure in said settling zones; withdrawing a single stream of said acid catalyst from said acid recovery zone and passing at existing temperature a portion thereof at existing temperature to said first alkylation zone; passing a remaining portion of the recovered acid thru a heat exchange zone to cool same to below the temperature in a said second alkylation zone and passing the cooled acid to said second alkylation zone, thereby effecting all of the heat exchange required in the acid catalyst in a single heat exchange zone; maintaining separate bodies of first and second alkylates in said separate settling zones; and withdrawing separate streams of said first alkylate and said second alkylate from said separate bodies thereof.

16. The process of claim 15 wherein hydrofluoric acid is used as the alkylation catalyst.

17. A process for simultaneously and separately alkylating a first stream consisting principally of lighter $C_3$ to $C_7$ olefin and a $C_4$ to $C_8$ isoparaffin and a second stream consisting principally of heavier $C_3$ to $C_7$ olefin and said isoparaffin which comprises passing said first stream in admixture with an alkylating acid catalyst thru a first alkylator under alkylating conditions including a higher temperature in the range of about 50 to 200° F. to form a first alkylate-acid stream; simultaneously passing said second stream in admixture with said acid thru a second alkylator under alkylating conditions including a higher temperature in said range to form a second alkylate-acid stream; passing said first and second alkylate-acid streams to separate settling zones to separately recover the respective alkylates from the acid; mixing the acid recovered from said alkylate streams so as to provide a mixed acid temperature intermediate said higher and said lower temperatures; passing separate streams of said mixed acid substantially at said intermediate temperature to said alkylators, thereby materially reducing the heat exchange requirements in said first alkylator.

18. The process of claim 17 wherein said first stream consists essentially of propylene and isobutane and said second stream consists essentially of butylenes and isobutane; the temperature in said first alkylator is maintained in the range of 110 to 125° F. and the temperature in said second alkylator is maintained in the range of 60 to 95° F., and HF is used as said acid catalyst.

19. The process of claim 18 comprising the additional steps of passing the alkylate stream from said first settler to a defluorinator-depropanizer to recover overhead $C_3$ and residual HF and a bottoms stream of alkylate and isobutane; passing the alkylate stream from said second settler in admixture with said bottoms stream to a deisobutanizer to recover an overhead stream of isobutane and a bottoms stream of alkylate from both alkylators.

References Cited by the Examiner
UNITED STATES PATENTS

| | | | |
|---|---|---|---|
| 2,340,600 | 2/44 | Lamb et al. | 260—683.59 |
| 2,356,374 | 8/44 | Blount | 260—683.58 |
| 2,370,164 | 2/45 | Hemphell | 260—683.58 |
| 2,417,251 | 3/47 | Hemminger | 260—683.58 |
| 2,906,796 | 9/59 | Putney | 260—683.62 |

ALPHONSO D. SULLIVAN, *Examiner*.